United States Patent [19]

Ertl

[11] Patent Number: 4,464,945
[45] Date of Patent: Aug. 14, 1984

[54] GEAR MECHANISM FOR MOTOR VEHICLES

[75] Inventor: Herbert Ertl, Starnberg, Fed. Rep. of Germany

[73] Assignee: Interparte Aktiengesellschaft, Vaduz, Liechtenstein

[21] Appl. No.: 235,630

[22] Filed: Feb. 18, 1981

[30] Foreign Application Priority Data

Feb. 23, 1980 [DE] Fed. Rep. of Germany ....... 3006811

[51] Int. Cl.³ .............................................. F16H 37/00
[52] U.S. Cl. .................................... 74/15.6; 74/15.66;
74/15.84; 74/745; 74/606 R
[58] Field of Search ...................... 74/740, 15.2, 15.6,
74/15.66, 15.8, 15.82, 15.84, 15.86, 745, 192,
606 R, 329; 464/84

[56] References Cited

U.S. PATENT DOCUMENTS

| | | | |
|---|---|---|---|
| 1,269,944 | 6/1918 | Leonard | 74/329 |
| 2,103,543 | 12/1937 | McCormack et al. | 74/15.86 X |
| 2,975,643 | 3/1961 | Ferguson | 74/15.2 |
| 4,016,731 | 4/1977 | Foushee | 64/15 |
| 4,116,313 | 9/1978 | Maucher | 74/15.66 |
| 4,126,201 | 11/1978 | Stevens | 180/70 R |
| 4,273,007 | 6/1981 | Sato et al. | 74/745 |
| 4,326,597 | 4/1982 | Murayama et al. | 74/745 |
| 4,351,196 | 9/1982 | Yoshida et al. | 74/15.86 |

Primary Examiner—Lawrence J. Staab
Assistant Examiner—Anthony William Raskob, Jr.
Attorney, Agent, or Firm—Watson, Cole, Grindle & Watson

[57] ABSTRACT

In a motor vehicle gear drive a transmission block as well as a back-gear stage (7, 32), a power take-off stage (10,11) and a differential gear (39,41) for an axle drive (44) are all arranged in a common housing (20). The whole transmission is directly couplable to a driving engine (1) by way of a clutch (3). Engines with differing r.p.ms and outputs can be reduced to the same r.p.m. by means of the back-gear stage (7,32). The power take-off stage (10,11) arranged on the layshaft (6) of the back-gear stage (7,32) and having a coupling device (9) drives a reduction gear (14), at which the drive pinion shaft (15) and the output gear shaft (16,17) are led outside the housing of the reduction gear (14). In this way these shafts (15; 16,17) rotating at different r.p.m. can drive different working devices, which can be driven whether the vehicle is travelling or stationary by virtue of the controllable power take-off (10,11).

1 Claim, 6 Drawing Figures

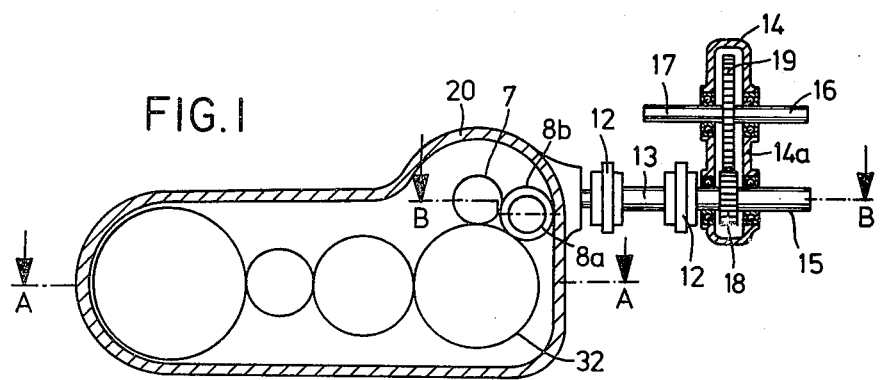
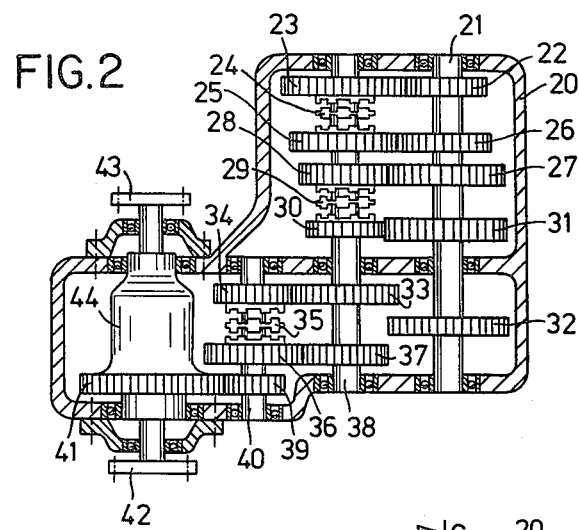
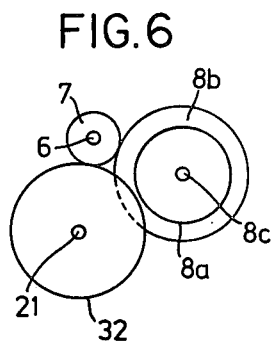
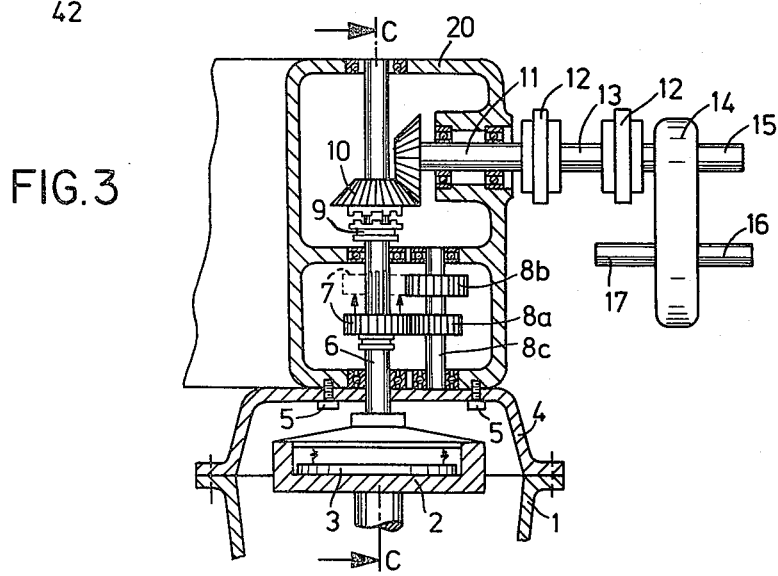

GEAR MECHANISM FOR MOTOR VEHICLES

BACKGROUND OF THE INVENTION

1. Field of the Invention

This invention concerns a gear mechanism for motor vehicles which is in essential respects distinguished from known gear mechanisms of this type as regards construction, operation and versatility of use.

SUMMARY OF THE INVENTION

The underlying task of the present invention is the provision of a gear mechanism for motor vehicles, especially for commercial and cross-country vehicles, which is usable and adaptable in a versatile manner and permits different modes of operation. This task is solved as set forth below.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein FIG. 1 is a schematic respresentation of the construction of the gear mechanism, with a reduction gear connected thereto, in a vertical position;

FIG. 2 is a plan view of the partial section taken along the line A—A in FIG. 1;

FIG. 3 is a plan view of the partial section taken along the line B—B in FIG. 1, with a reduction gear connected thereto, in a horizontal position;

FIG. 6 is a schematic view showing the engagement of reversing gears within the gear mechanism.

DETAILED DESCRIPTION OF THE PREFERRED EMBODIMENT

Figure 4:
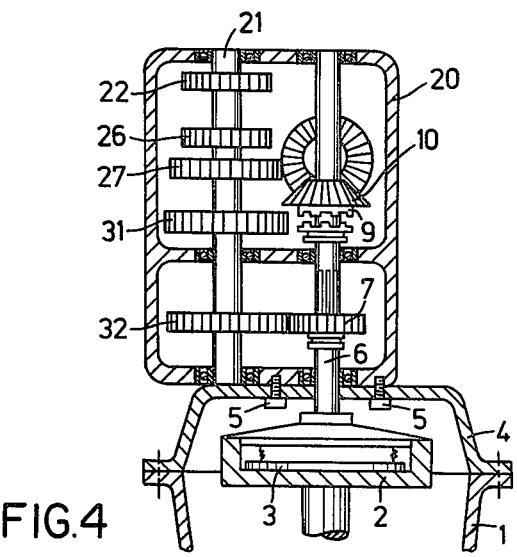
FIG. 4 is a partial section along the line C—C in FIG. 3.

The gear mechanism or transmission schematically illustrated in FIGS. 1 to 6 is destined for commercial vehicles, especially cross-country vehicles, and consists essentially of back-gear stage, 7,32 change-speed gearing 21-31 assembly, a differential gear 39,41 for an axle drive 44 and a power take-off 10,11. These gears are combined together in a common housing 20. The back gear stage includes a shaft 6 upon which is mounted gear 7. The whole gearing is coupled directly to the engine 1 via a clutch 3 integrally constructed with a flywheel 2. In order to enable the mechanism to be universally usable for different vehicles and for additional or special devices, the individual gear units are constructed in a modular design according to unitary construction.

A clutch housing 4 is arranged between the common housing 20 and the engine 1 and is flanged to the common housing 20 by means of screws 5; it is formed as a so-called adaptation housing so that different engine types with matching clutch housing bells may be attached to the gear mechanism.

A back-gear stage, 7,32 is arranged between the engine 1 and the change-speed gears 21-31 to enable differing engine r.p.ms to be reduced to the same r.p.m, the matching to differing engine r.p.ms taking place by changing the transmission ratio in the back gear stage, 7,32. The use of this back-gear stage, 7,32 for low r.p.m. engines admits of a higher torque for the same transmission load, whereby a step-down stage is obviated. However, more powerful engines of lower r.p.m. may also be used with the same transmission components.

A pair of reversing gears 8a, 8b are arranged at the back-gear stage, 7,32 on shaft 8c to enable the whole gear stage to run in two opposite directions of rotation. In this way the transmission itself can be arranged in two mounting positions, thus on the one hand with the differential 39, 41 in the direction of travel and on the other hand opposite to the direction of travel. This leads to the result that the whole drive block can be mounted in front of and behind the non-illustrated drive shaft. This variation facility is particularly significant for cross-country and commercial vehicles as it allows the center of gravity of the vehicle to be fixed in the most favorable way and creates numerous possibilities for the attachment of special working units.

To enable the speed of travel to be adapted to the actually required mode of operaton—i.e. driving in road traffic or cross-country driving—a two-stage transmission gear mechanism 33-38 is built in between the change-speed gears 21-31 and the differential gears 39,41. The change-speed gears 21-31 of conventional construction have gear-wheel 22 for the first gear mounted on a primary transmission shaft 21, which wheel can by means of a shaft dog 24 be brought into meshing engagement with a change gear 23 arranged on a parallel secondary transmission shaft 38. The same shift dog 24 is also used to mesh the change gear 25 on the transmission shaft 38 with the gear wheel 26 for the second gear 26 arranged on the primary transmission shaft 21. Further, on this transmission shaft 21 are arranged the gear wheel 27 for the third gear and the gear wheel 31 for the fourth gear. A change gear 28 for the third gear and a change gear 30 for the fourth gear arranged on the transmission shaft 38 are brought into mesh with the gear wheel 27 and the gear wheel 31, respectively, by means of a shift dog 29.

As described above, the two-stage transmission gear mechanism 33-38 serves for matching the travel velocities to the mode of operation in road traffic or cross-country and has a gear wheel 33, for rapid travel, arranged on the secondary transmission shaft 38. Wheel 33 is meshingly engageable with a lay change gear wheel 34 arranged on the layshaft 40 by means of a shift dog 35. Further, a lay change gear wheel 36 for slow travel is meshingly engageable by means of the shift dog 35 with the lay gear wheel 37 arranged on the transmission shaft 38. The differential driving pinion 39 of the differential gear 39, 41 is furthermore arranged on the layshaft 40 and is in meshing engagement with the differential driving gear wheel 41. The latter drives the axle drive shaft 42 and 43 of the axle drive 44.

Figure 5:
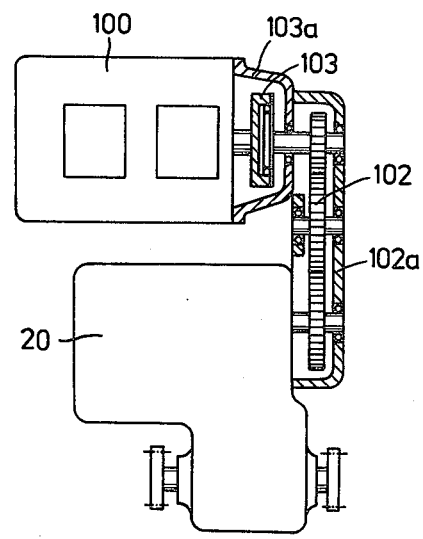
FIG. 5 is a schematic plan view of a preferred embodiment of an engine and gear mechanism in a parallel arrangement.

FIG. 5 shows that in case of need, when the drive consisting of an engine 100 and the gear mechanism in the common housing 20 must be particularly narrowly constructed, the housing 20 and the engine 100 may be arranged in parallel with each other and the two units may be operatively connected by way of an intermediate gear 102. To this end the clutch housing 4 of the embodiment according to FIGS. 1 to 4 is replaced by an intermediate gear casing 102a and a clutch casing 103a for the clutch 103.

The gear mechanism according to the invention is even more versatile. In order to take up the driving of working devices coupled thereto both when the vehicle is moving and when it is stationary, a power take-off 10,11 with a coupling device 9 is arranged on the lay-shaft 6 of the back gear stage, 7,32. A reduction gear 14 being arranged outside the common housing 20 and being driven by the power take off 10, 11 reduces the r.p.m. to the desired r.p.m. of the working devices. The shaft 15 of the driving pinion 18 as well as the shafts 16,17 of the output gear 19 are led out of the casing of the reduction gear 14. In this way output or power can be taken off the two shafts at different r.p.m. Thus with a single engine and gear mechanism not only may all the driving (travelling) functions be carried out but also simultaneously fast-running pumps and electric motors of high r.p.m. and standard working machines of low r.p.m. may be driven. The connection between the power take off 10, 11 and the reduction gear 14 ensues via a shaft 13 and two resilient joints (couplings) 12, whereby the position of the reduction gear 14 may without particular difficulty in assembly be adapted to any given vehicle.

As already mentioned, if the shafts 16,17 of the output wheel 19 of the reduction gear 14 are led out of the housing at both sides, a power connection can be effected on both sides, with differeing directions of rotation relative to the end of the respective driving shaft stubs 16 or 17. The casing of the reduction gear 14 may be attached to the vehicle to any desired angular position relative to the axis of the pinion 18. In this way, the output shafts 16,17 may be positioned in any desired angular position along a circular arc about the axis of the pinion 18, with a radius equal to the distance between the shaft 15 and the shafts 16,17.

Obviously, numerous modifications and variations of the present invention are possible in light of the above teachings. It is therefore to be understood that within the scope of the appended claims, the invention may be practiced otherwise than as specifically described herein.

I claim:

1. A gear mechanism for a motor vehicle having an engine, said gear mechanism being disposed within a common casing and comprising:

a back gear stage comprising a driving shaft, a first gear mounted on said driving shaft and a second gear operatively associated with said first gear;

a primary transmission shaft having said second gear mounted thereon;

a secondary transmission shaft mounted mutually parallel with respect to said primary transmission shaft;

change speed gearing for changing travel speed of said motor vehicle and comprising a plurality of gears mounted on said primary and secondary transmission shafts;

a two-stage transmission gear assembly comprising a lay-shaft having a driving pinion gear mounted thereon, and first and second gears mounted on said secondary transmission shaft for driving said layshaft such that said two stage transmission gear assembly matches said travel speed of said motor vehicle with varying driving conditions;

a differential gear assembly including said driving pinion gear mounted on said layshaft;

first and second driving shafts driven by said driving pinion gear for driving said motor vehicle;

a power take off assembly engageable with said driving shaft of said back gear stage for separately driving a plurality of working devices and having a power take off shaft extending to the exterior of said common casing;

a coupling device for engaging said driving shaft of said back gear stage with said power take off assembly;

a reversing gear mechanism having a first gear and a second gear each mounted on a reversing gear shaft, said reversing gear shaft journaled within said common casing and parallel with said primary transmission shaft; and said first gear of said back gear stage movably mounted on said driving shaft of said back gear stage from a first position to a second position for meshing engagement with said first gear mounted on said reversing gear shaft, and wherein said second gear mounted on said reversing gear shaft engages said second gear of said back gear stage so as to provide opposite directions of rotation to said gear mechanism.

* * * * *